US005650935A

United States Patent [19]
Nishino et al.

[11] Patent Number: 5,650,935
[45] Date of Patent: Jul. 22, 1997

[54] APPARATUS FOR CALCULATING INTENSITY OF AN ELECTROMAGNETIC FIELD

[75] Inventors: Sekiji Nishino; Makoto Mukai; Shinichi Ohtsu; Kenji Nagase, all of Kawasaki, Japan

[73] Assignee: Fujitsu Limited, Kawasaki, Japan

[21] Appl. No.: 351,213

[22] Filed: Nov. 30, 1994

[30] Foreign Application Priority Data

Feb. 25, 1994 [JP] Japan .................................. 6-027109

[51] Int. Cl.⁶ ........................... G01R 29/08; G06F 17/50
[52] U.S. Cl. ...................... 364/481; 340/572; 324/260; 364/554
[58] Field of Search .......................... 364/802, 806, 364/578, 524, 554, 481; 340/572; 324/244, 260

[56] References Cited

U.S. PATENT DOCUMENTS 5,005,147  4/1991  Kaishen et al. ...................... 364/578

OTHER PUBLICATIONS

Wang et al., "Sinusoidal Reaction Formulation for Radiation and Scattering from Conducting Surfaces," *IEEE Transactions on Antennas and Propagation*, vol. AP-23, No. 3, May 1975, pp. 376-381.

Chtsu, Shinichi; "Analysis of radiation from common-mode current by moment method", International Symposium on electromagnetic compatibility, May 1994.

Makoto mukai; "Analysis of radiation from opening metal cabinet enclosing printed circuit board", International Symposium on electromagnetic compatibility, May 1994.

Tsuboi, H.; "electomagnetic field analysis of the wire antenna in the presence of a delectric with three-dimensional shape", IEEE Transactions on Magnetics, vol. 25, No. 5 Sep. 1989.

*Primary Examiner*—Emanuel T. Voeltz
*Assistant Examiner*—Kamini S. Shah
*Attorney, Agent, or Firm*—Staas & Halsey

[57] ABSTRACT

In a calculation apparatus for calculating intensity of an electromagnetic field radiated from an electronic circuit device, the apparatus includes: an input data file for storing structural information of the device; an input unit for receiving structural information of the device to be analyzed from the input data file; a section unit for dividing the device into applicable sections for a distributed constant circuit method and inapplicable sections for the method by analyzing the structural information of the device; a first calculation unit for calculating current distribution at the applicable sections using the distributed constant circuit method; a second calculation unit for calculating current distribution at the inapplicable sections using a moment method and using the current distribution obtained by the first calculation unit; a third calculation unit for calculating the intensity of electromagnetic fields radiated from the device based on the current distributions obtained from the first and second calculation unit; and an output unit for outputting the calculated intensity of the electromagnetic fields to an output data file.

19 Claims, 17 Drawing Sheets

Fig.1C $\boxed{E \propto F^2 \times I \times S}$

Fig.2C  E→DEPENDENT ON CURRENT DISTRIBUTION

Fig.7

| $ FREQENCY | FREQUENCY |
|---|---|
| $ CONVERGENCE | CONVERGENCE DECISION VALUE |
| | |

Fig.8

| $ PATTERN | YES/NO OF OUTPUT OF ELECTRIC RADIATION PATTERN |
|---|---|
| $ COUNTOUR | YES/NO OF OUTPUT OF ELECTRIC FIELD FOR EQUIVALENT PATTERN |
| | |

Fig.11

| $ POINT | POINT NO., X, Y, Z COORDINATE VALUES |
|---|---|
| $ WIRE | WIRE NO., MATERIAL NO., POINT NOs. 1 AND 2 |
| $ PATCH | PATCH NO., MATERIAL NO., POINT NOs. 1 TO 4 |
| $ MATERIAL | MATERIAL NO., KIND, DIELECTRIC RATE, CONDUCTIVITY, DIAMETER OF WIRE |
| $ BOARD | BOARD NO., MATERIAL NO., POINT NOs. 1 TO 4 |
| $ SEGMENT | BOARD NO., SEGMENT NO., X, Y COORDINATE VALUES, LAYER NO. |
| $ PIN | BOARD NO., PIN NO., X, Y COORDINATE VALUES, LAYER NO., CIRCUIT NO., WAVE SOURCE NO. |
| $ SOURCE | WAVE SOURCE NO., DESTINATION POINT NO., VOLTAGE VALUE |
| $ LOAD | LOAD NO., DESTINATION POINT NO. LOAD IMPEDANCE |

Fig.16A $$\begin{array}{c} \phantom{1} \phantom{Z_{11}} \longrightarrow j \\ \phantom{1} \begin{array}{ccc} 1 & j & m \end{array} \\ \begin{array}{c} 1 \\ i \\ m \end{array} \left[ \begin{array}{ccccc} Z_{11} & \cdots & Z_{1j} & \cdots & Z_{1m} \\ \cdots & \cdots & \cdots & \cdots & \cdots \\ Z_{i1} & \cdots & [Z_{ij}] & \cdots & Z_{im} \\ \cdots & \cdots & \cdots & \cdots & \cdots \\ Z_{m1} & \cdots & Z_{mj} & \cdots & Z_{mm} \end{array} \right] \end{array}$$

$i \downarrow$

Fig.16B $$\begin{array}{c} \phantom{Z_{11}} \longrightarrow k \\ \begin{array}{ccc} 1 & k & n \end{array} \\ \left[ \begin{array}{ccccc} Z_{11} & \cdots & Z_{1k} & \cdots & Z_{1n} \\ \cdots & \cdots & \cdots & \cdots & \cdots \\ Z_{i1} & \cdots & [Z_{ik}] & \cdots & Z_{in} \\ \cdots & \cdots & \cdots & \cdots & \cdots \\ Z_{m1} & \cdots & Z_{mk} & \cdots & Z_{mn} \end{array} \right] \end{array}$$

Fig.17

$$\begin{bmatrix} Z_{11} & \cdots & Z_{1j} & \cdots & Z_{1m} \\ \vdots & \cdots & \vdots & \cdots & \vdots \\ Z_{i1} & \cdots & Z_{ij} & \cdots & Z_{im} \\ \vdots & \cdots & \vdots & \cdots & \vdots \\ Z_{m1} & \cdots & Z_{mj} & \cdots & Z_{mm} \end{bmatrix} \begin{bmatrix} I_1 \\ \vdots \\ I_i \\ \vdots \\ I_m \end{bmatrix} = \begin{bmatrix} V_1 + \Sigma Z_{1k} \cdot I_1 \\ \vdots \\ V_i + \Sigma Z_{ik} \cdot I_k \\ \vdots \\ V_m + \Sigma Z_{mk} \cdot I_m \end{bmatrix}$$

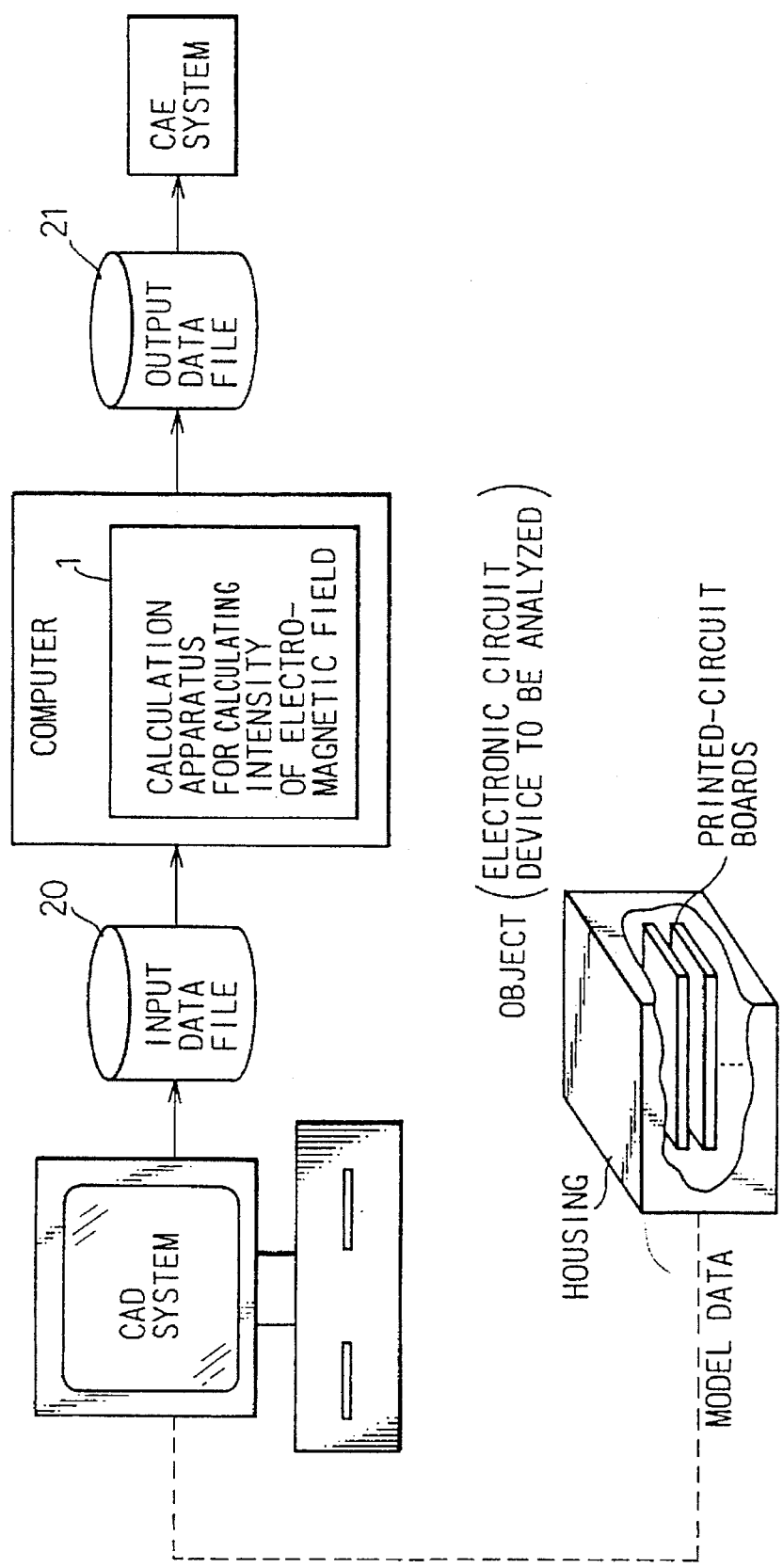

5,650,935

APPARATUS FOR CALCULATING INTENSITY OF AN ELECTROMAGNETIC FIELD

BACKGROUND OF THE INVENTION

1. Field of the Invention

The present invention relates to an apparatus for calculating the intensity of an electromagnetic field. The calculation apparatus according to the present invention can easily calculate the intensity of electromagnetic fields radiated from an electronic circuit device at high speed and with high precision.

2. Description of the Related Art

In a design process of an electronic circuit device including printed-circuit boards and housing, it is very important to calculate the intensity of the electromagnetic fields radiated therefrom.

In general, if the current flowing through each part of an electronic circuit device having an optional shape (structure) can be known, it is easy to calculate the intensity of the electromagnetic fields radiated therefrom by using known theory. That is, theoretically, the current flowing through each part of the circuit device can be calculated by solving Maxwell's electromagnetic wave equation under predetermined boundary conditions. However, in general, Maxwell's equation is effective for simple boundary conditions, and not effective for complicated boundary conditions. Accordingly, a theoretical solution of the current has not been found in the case of complicated boundary conditions.

Accordingly, all solution methods for obtaining the current under complicated boundary conditions, which are utilized in the recent calculation apparatus for intensity of electromagnetic fields, employ an approximated solution method.

Three typical approximated solution methods are known, i.e., an approximated solution method using a very small loop antenna (below, a very small loop-antenna method), an approximated solution method using a distributed constant circuit (below, a distributed constant circuit method), and an approximated solution method using a moment (below, a moment method).

However, each of these three methods has advantages and disadvantages as explained below. The present invention takes advantage of the distributed constant circuit method and the moment method so that it is possible to realize high speed and high precision calculation of the intensity of the electromagnetic fields as explained in detail below.

SUMMARY OF THE INVENTION

The object of the present invention is to provide a calculation apparatus for calculating intensity of electromagnetic field radiated from an electronic circuit device having an optional structure at high speed and with high precision.

In accordance with the present invention, there is provided a calculation apparatus for calculating the intensity of an electromagnetic field radiated from an electronic circuit device, including: an input data file for storing structural information of the device; an input unit for receiving structural information of the device to be analyzed from the input data file; a section unit for dividing the device into two sections, i.e., one section applicable for a distributed constant circuit method and the other section unapplicable for the method by analyzing the structural information of the device; a first calculation unit for calculating current distribution at the applicable sections using the distributed constant circuit method; a second calculation unit for calculating current distribution at the inapplicable sections using a moment method and using the current distribution obtained by the first calculation unit; a third calculation unit for calculating the intensity of electromagnetic fields radiated from the device based on the current distributions obtained from the first and second calculation unit; and an output unit for outputting the calculated intensity of the electromagnetic fields to an output data file.

In one preferred embodiment, the second calculation unit includes: a mutual impedance calculation unit for calculating a first and second mutual impedances, the first being the mutual impedance between inapplicable sections, and the second being the mutual impedance between the applicable sections and the inapplicable sections; an induced wavesource calculation unit for calculating a wavesource induced by the current distribution to the inapplicable sections in accordance with matrix calculation between the current distribution obtained by the first calculation unit and the second mutual impedance obtained by the mutual impedance calculation unit; and a current distribution calculation unit for calculating the current distribution at the inapplicable sections based on the moment method by using the first mutual impedance in accordance with the wavesource.

In another preferred embodiment, the current distribution calculation unit utilizes composite values of two wavesources for the moment method, the first being the wavesource calculated by the induced wavesource calculation unit, and the second being a proper wavesource included in the inapplicable sections.

In still another preferred embodiment, the input data file stores the structural information in the form of three statement blocks using various section symbols, i.e., an analysis control statement block, a model description statement block, and an output control statement block.

In still another preferred embodiment, the analysis control statement block includes at least the section symbols indicating frequencies and convergence decision values.

In still another preferred embodiment, the output control statement block includes at least the section symbols indicating electric field radiation patterns and electric field equivalent value patterns. In still another preferred embodiment, the model description statement block includes at least the section symbols indicating point number, wiring number, patch number, material number, printed-circuit number, wavesource number, load number segment number, and X-Y coordinate.

In still another preferred embodiment, the section unit divides the device into the applicable sections for the distributed constant circuit method and the inapplicable sections for the method based on the section symbols.

In still another preferred embodiment, the section unit determines the applicable sections for the distributed constant circuit method to parts of device which can be approximated as one dimensional structure.

In still another preferred embodiment, the approximated dimensional structures are given by a printed-circuit board having signal wiring layers and ground wiring layers.

In still another preferred embodiment, the section unit determines the applicable sections for the distributed constant circuit method to cable portions having a coaxial structure.

In still another preferred embodiment, the section unit determines the applicable sections for the distributed constant circuit method to parallel wiring portions.

In still another preferred embodiment, the section unit determines the applicable sections for the distributed constant circuit method to parallel plane board portions.

In still another preferred embodiment, the section unit determines the applicable sections for the distributed constant circuit method to structural portions formed in parallel by a plane board and wiring.

In still another preferred embodiment, the inapplicable sections for the distributed constant circuit method are equivalent to the applicable sections for the moment method.

In still another preferred embodiment, the signal wiring layer on the printed-circuit board is modeled by X-Y coordinates for pins, segments and vias on each board in the distributed constant circuit method.

In still another preferred embodiment, a metal surface of a housing of the device to be analyzed is divided into a plurality of square patches or triangular patches each having points in corners thereof.

BRIEF EXPLANATIONS OF THE DRAWINGS

In the drawings:

FIGS. 1A to 1C are explanatory views for explaining a very small loop antenna method;

FIG. 2A to 2C are explanatory views for explaining a distributed constant circuit method;

FIG. 7 shows one example of the data structure of an analysis control statement block shown in FIG. 6;

FIG. 8 shows one example of the data structure of an output control statement block shown in FIG. 6.

FIG. 11 shows one example of the data structure of a model description statement block shown in FIG. 6;

FIGS. 16A and 16B are explanatory views for explaining mutual impedance;

FIG. 17 is an explanatory view for explaining an integration equation;

FIG. 21 is a schematic block diagram of a system applying the present invention.

DESCRIPTION OF THE PREFERRED EMBODIMENTS

Before explaining preferred embodiments, three typical solution methods, i.e., a very small loop-antenna method, a distributed constant circuit method, and a moment method, are explained in detail below.

Figure 1A:
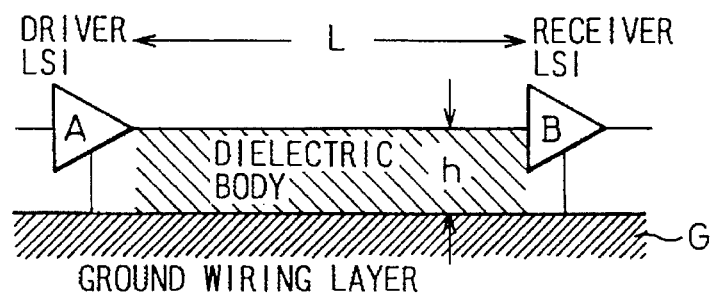
Figure 1B:
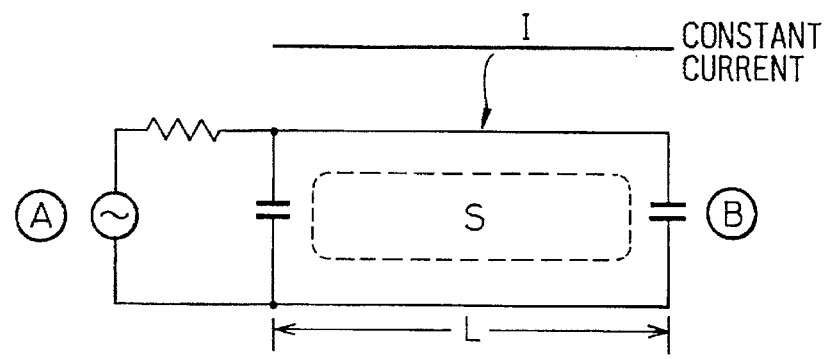

FIGS. 1A to 1C are explanatory views for explaining a very small loop antenna method. In FIG. 1A, "A" denotes a driver LSI (Large Scale Integrated) circuit used as a wave-source circuit, and "B" denotes a receiver LSI used as a load circuit. "L" denotes a length of wiring between the driver LSI and the receiver LSI, and a dielectric body is provided therebetween. Further, "h" denotes a height of the dielectric body, and "G" denotes a ground wiring layer. The loop antenna is formed by the wiring L and the ground wiring layer G.

In FIG. 1B, this circuit represents an equivalent circuit of FIG. 1A. An area of the loop antenna is shown by "S". It is assumed that a constant current "I" flows in the loop antenna. In the very small loop antenna method, the current I is calculated by using a calculation method of a concentrated constant circuit.

In FIG. 1C, an amount of electromagnetic radiation from the loop antenna can be expressed as follows.

$$E = F^2 \times I \times S$$

Where,

E is an amount of electromagnetic radiation;

F is frequency of current;

I is an amount of constant current; and

S is area of loop antenna.

As is obvious from the above formula, the amount of electromagnetic radiation is proportional to a square of frequency, constant current and size of area. Accordingly, this very small loop antenna method appears to be very simple. However, the preciseness of the result of calculation becomes worse under the conditions which cannot ignore the size of the loop compared to the wavelength of the electromagnetic wave. Accordingly, this method is not popular in this field.

Figure 2A:
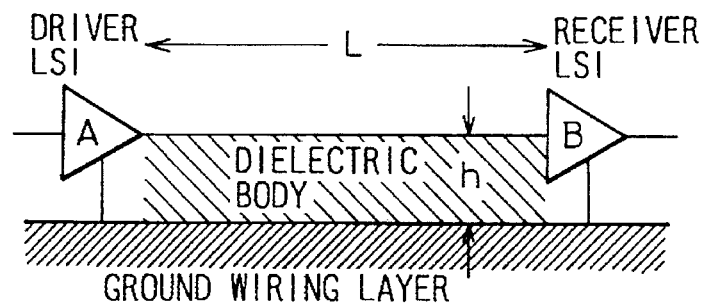
Figure 2B:
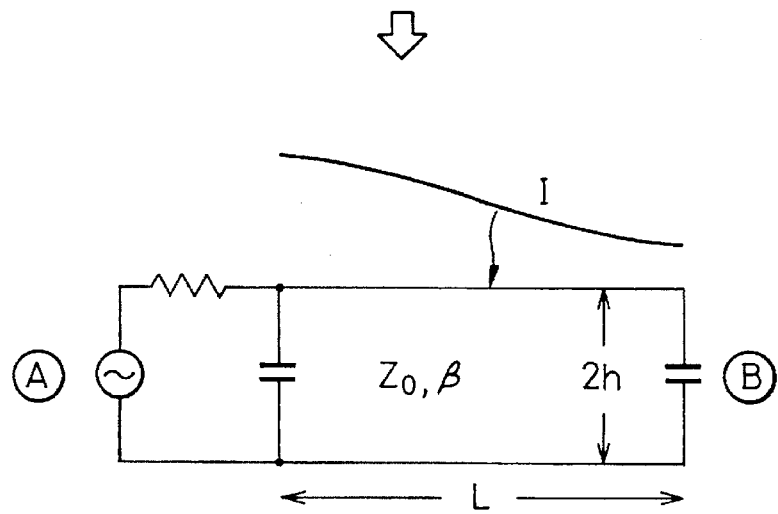

FIGS. 2A to 2C are explanatory views for explaining a distributed constant add method. In FIG. 2A, the same reference numbers used in FIG. 1A are attached to the same components in this drawing. In this method, the current can be obtained by applying an equation of the distributed constant circuit to an object (i.e., electronic circuit device) which can approximate as one dimensional structure (for example, a printed-circuit board), and the calculation method is relatively simple.

Further, calculation time and memory capacity only increase in proportion to the number of analysis elements, and it is possible to perform various analysis including reflection and resonance of the circuit. Accordingly, it is possible to perform high speed and precise analysis of the object which can be approximated as a one dimensional structure.

In FIG. 2B, this circuit represents an equivalent circuit of FIG. 2A. "$Z_0$" denotes a characteristic impedance of the loop circuit, and $\beta$ denotes a propagation constant. In this method, it is assumed that the current I flowing in the loop circuit is not constant.

As shown in FIG. 2C, in the distributed constant circuit method, an amount of the electromagnetic radiation E depends on the distribution of the current I in the loop circuit.

Figure 3:
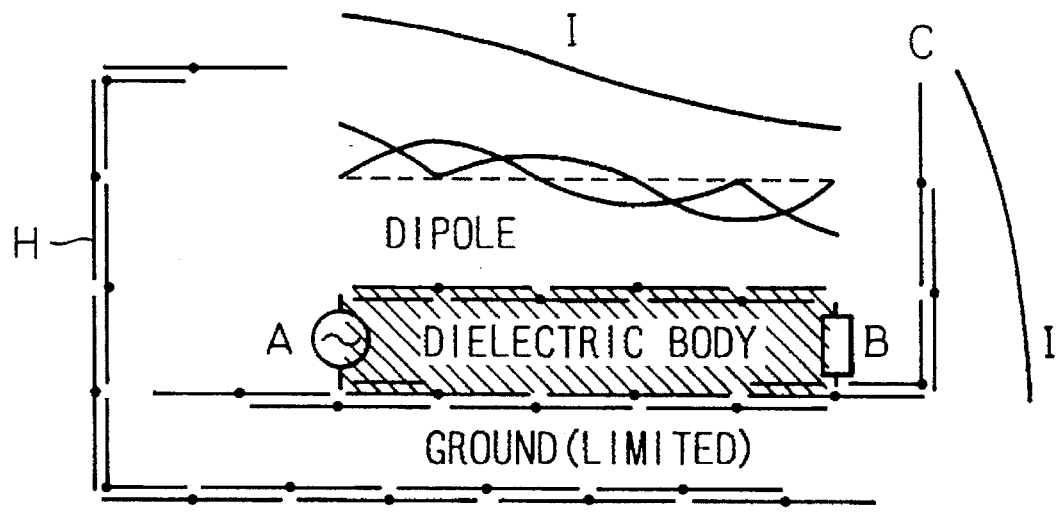
FIG. 3 is an explanatory view for explaining a moment method.

FIG. 3 is an explanatory views for explaining a moment method. This method utilizes an integrational equation derived from Maxwell's equation, and can be applied to a three dimensional object having an optional structure. Concretely, the object is divided into a plurality of small elements to calculate the current. In this case, calculation time and memory capacity increase approximately in proportional to the square of the number of the analysis elements.

In FIG. 3, "H" denotes a housing, and "C" denotes a cable. The housing and the dielectric body are divided into a plurality of small elements (i.e., patches) in order to calculate the electromagnetic field. Although only one dielectric body (i.e., printed-circuit board) is shown in the drawing, a plurality of dielectric bodies are provided in the housing. In this case, the current I is not constant in the circuit.

In the above three solution methods, if the object to be analyzed can be approximated as one dimensional structure, it is possible to calculate the current flowing in the circuit device by using the distributed constant circuit method at high speed and with high precision. As a result, it is possible to calculate the intensity of the electromagnetic fields radiated from the electronic circuit device.

However, the distributed constant circuit method is only effective for a one dimensional structure. Accordingly, if the object has a three dimensional structure, it is very difficult to calculate the current. That is, the distributed constant circuit method is effective for calculating the current which flows in the printed-circuit board (i.e., an approximated one dimensional structure) consisting of a plurality of printed-circuit boards each having the ground layer and a plurality of coaxial cables at high speed and with high precision.

Particularly, in the case of the printed-circuit board having one surface or both surfaces and not having ground layers, easily influenced by the peripheral electromagnetic field, and radiating a large amount of electromagnetic field to the peripheral portions, the distributed constant circuit method is not effective for calculating the current. Accordingly, the distributed constant circuit method is not effective for analysis of all objects having an optional structure including various printed-circuit boards and housings.

On the other hand, the moment method can be utilized for all objects. However, when the size of an electronic circuit device to be analyzed becomes larger, the amount of calculation also becomes larger.

Accordingly, the object of the present invention is to provide a calculation apparatus for calculating the intensity of electromagnetic fields radiated from an electronic circuit device having an optional structure at high speed and with high precision.

Figure 4:
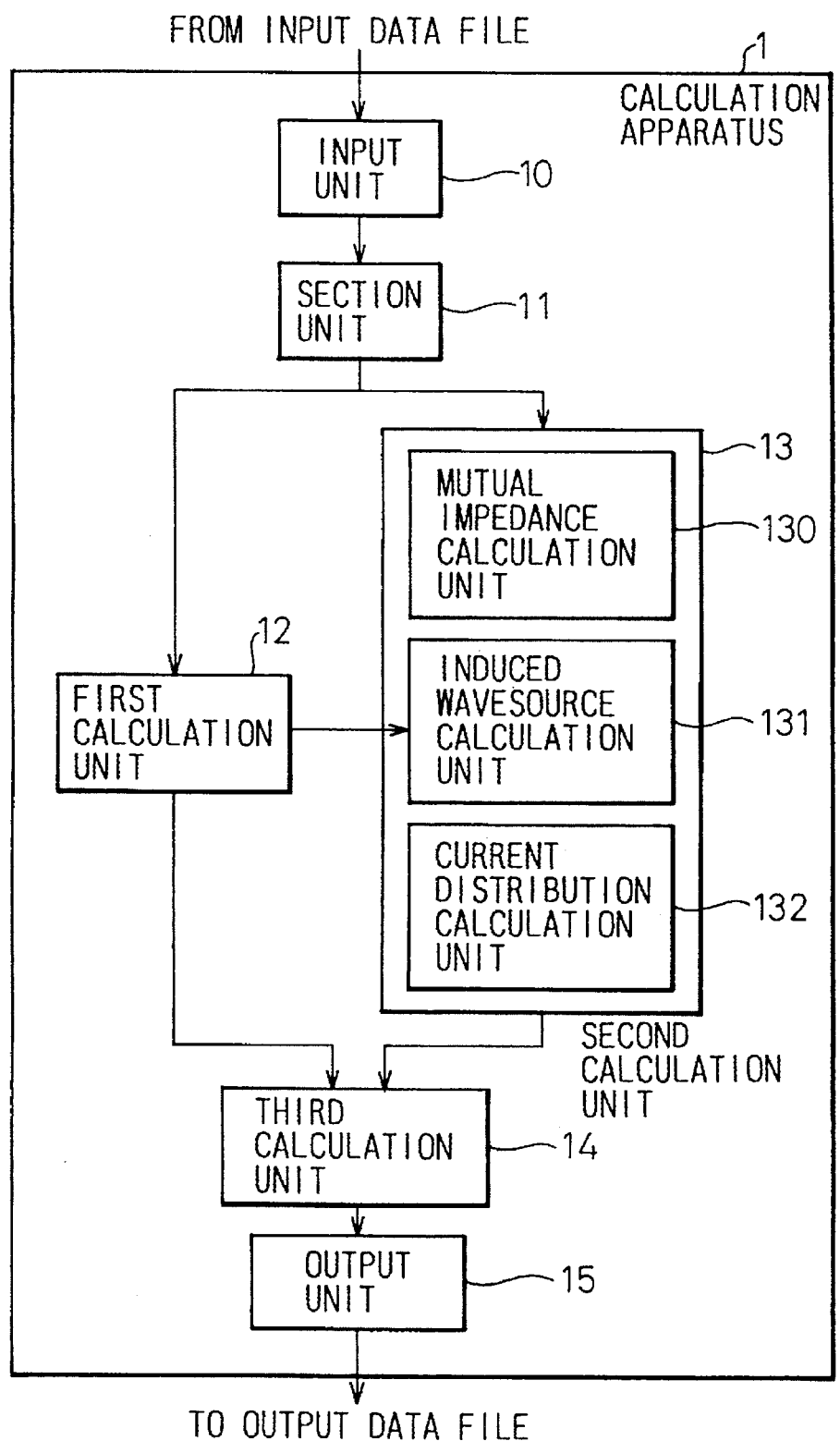
FIG. 4 shows a basic structural view of a calculation apparatus for the intensity of an electromagnetic field according to the present invention.

FIG. 4 shows a basic structural view of a calculation apparatus for calculating the intensity of an electromagnetic field according to the present invention. In FIG. 4, reference number 1 denotes a calculation apparatus for calculating the intensity of an electromagnetic field. In the calculation apparatus 1, reference number 10 denotes an input unit, 11 a section unit, 12 a first calculation unit, 13 a second calculation unit, 14 a third calculation unit, and 15 an output unit.

Figure 5:
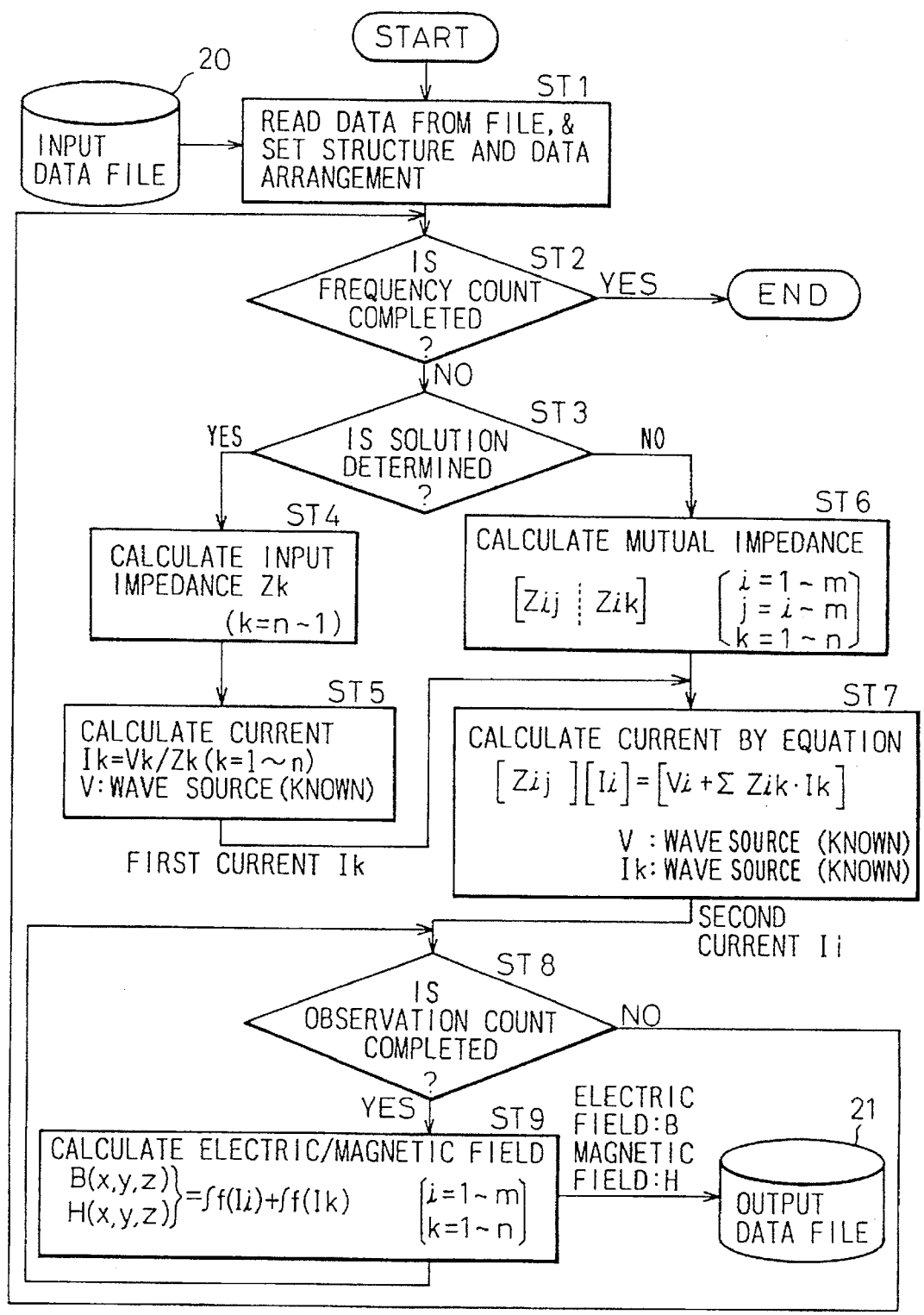
FIG. 5 is a process flowchart of the calculation apparatus according to the present invention.

The input unit 10 receives the structural information of the electric circuit device (i.e., shape of an object to be analyzed) from an external stage (for example, input data file shown in FIG. 5). The section unit 11 divides the electronic circuit device to be analyzed into two sections, i.e., one is an applicable section for the distributed constant circuit method, and the other is an inapplicable section for the distributed constant circuit method. The first calculation unit 12 calculates the current distribution for the applicable section by using the distributed constant circuit method. The second calculation unit 13 includes a mutual impedance calculation unit 130, an induced-wavesource calculation unit 131, and a current distribution calculation unit 132. The second calculation unit 13 calculates the current distribution for the inapplicable section by using the moment method based on the current distribution calculated by the first calculation unit 12.

The third calculation unit 14 calculates the intensity of electromagnetic fields based on the current distribution calculated by the first calculation unit 12 and the second calculation unit 13. The output unit 15 outputs the intensity of the electromagnetic fields calculated by the third calculation unit 13.

Briefly, in the present invention, the input unit 10 receives the structural information of the electronic circuit device, such as shape, size, material characteristics, and electrical characteristics, from the external state, and applies these structural information to the section unit 11. When the section unit 11 receives the structural information from the input unit 10, the section unit 11 analyzes the structural information, and divides the electronic circuit device to be analyzed into the applicable sections and the inapplicable sections for the distributed constant circuit method.

For example, an approximated one dimensional structure in the electronic circuit device, such as the printed-circuit boards having signal wiring layers and ground wiring layers, cable portions having coaxial structure, parallel wiring portions, and parallel plane board portions, are determined as the applicable sections which can apply the distributed constant circuit method. Further, other portions which are not as an approximated one dimensional structure are determined as the inapplicable sections which cannot apply the distributed constant circuit method.

In this case, for example, outer conductive portions of the cable are not determined as the applicable section of the distributed constant circuit method and are determined as the inapplicable section because sufficient precision of the calculation cannot be obtained therefrom.

The section unit 11 notifies the structural information including the applicable section for the distributed constant circuit method to the first calculation unit 12, and notifies both applicable and inapplicable sections to the second calculation unit 13.

When the first calculation unit 12 receives the structural information for the applicable section, the first calculation unit 12 calculates the current distribution of the electronic circuit device by using the wavesource included in the device and using the distributed constant circuit method.

When the second calculation unit 13 receives both applicable and inapplicable sections, the mutual impedance calculation unit 130 calculates the mutual impedance between the inapplicable sections (first mutual impedance) and between the applicable section and the inapplicable section (second impedance). Further, the induced-wavesource calculation unit 131 calculates the wavesource induced by the current distribution to the inapplicable section in accordance with the matrix calculation for the current distribution calculated by the first calculation unit 12 and for the second mutual impedance calculated by the mutual impedance calculation unit 130.

Further, the current distribution calculation unit 132 calculates the current distribution for the inapplicable section by solving an equation of the moment method formed by the matrix of the first mutual impedance calculated by the mutual impedance calculation unit 130. In this case, when calculating the current distribution, the current distribution calculation unit 132 utilizes the composite values which are obtained from the wavesource calculated by the calculation unit 131 and the proper wavesource provided in the inapplicable section of the electronic circuit device.

As explained above, in the present invention, the first calculation unit 12 calculates the current distribution in the applicable sections of the electronic circuit device by applying the distributed constant circuit method, and the second calculation unit 13 calculates the current distribution by applying the moment method. Further, the third calculation unit 14 calculates the intensity of the electromagnetic field based on the result of the current distributions calculated by the calculation units 12 and 13.

Basically, in the applicable sections of the electronic circuit device, the current distribution is calculated based on the distributed constant circuit method having simplified calculation. In this case, the wavesources, which are induced by the current, are not taken into account because the currents are very small in the inapplicable section.

On the other hand, in the inapplicable sections of the electronic circuit device, the current distribution is calculated based on the moment method at high precision. In this case, the wavesources, which are induced by the current, are taken into account because the current are very large in the applicable section.

The operations of the present invention will be explained in detail hereinafter.

FIG. 5 is a process flowchart of the calculation apparatus according to the present invention. In the drawing, reference number 20 denotes an input data file for storing the structural information of the electric circuit device to be analyzed, and reference number 21 denotes an output data file for storing the calculated intensity of the electric magnetic field.

Figure 6:
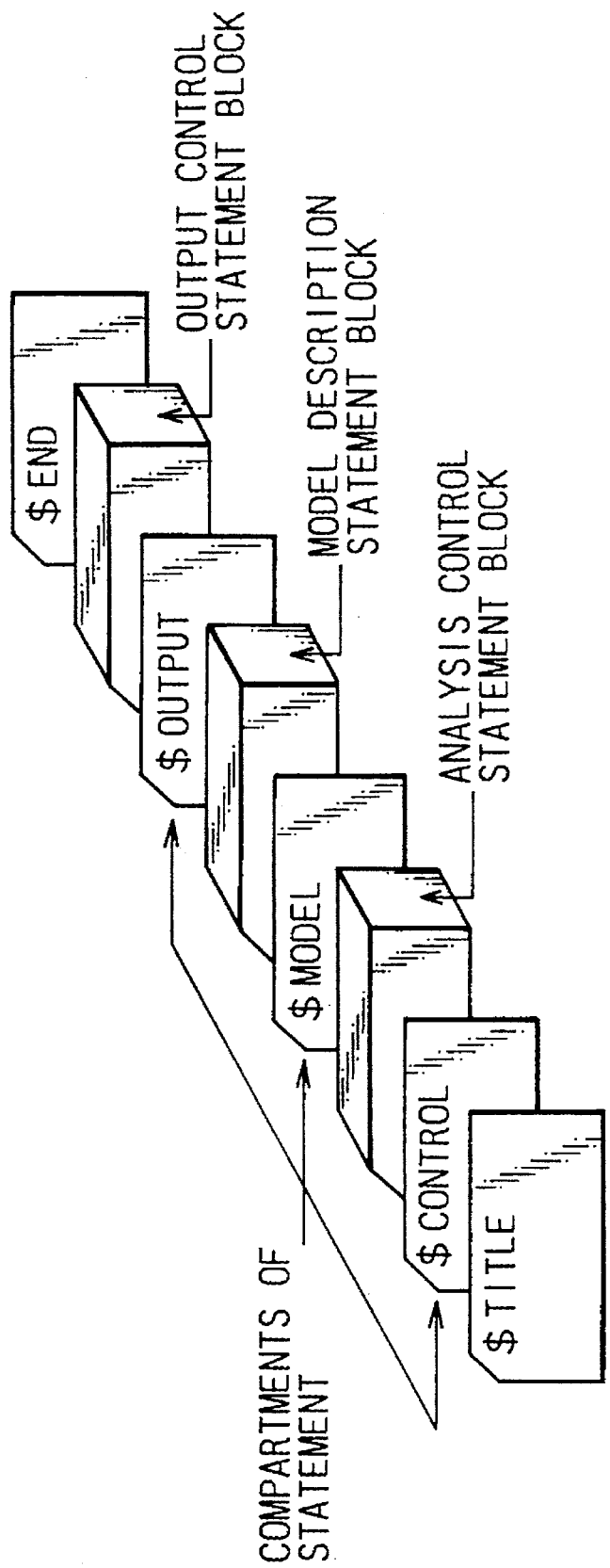
FIG. 6 shows one example of data structures stored in an input data file of FIG. 5.

FIG. 6 shows one example of data structures stored in the input data file of FIG. 5. The management data (i.e., data stored in the input data file 20) are input from a CAD system (see, FIG. 21), and mainly formed by three statement blocks, i.e., an analysis control statement block (see, FIG. 7), a model description statement block (see, FIG. 11) and an output control statement block (see, FIG. 8). In FIG. 6, the section symbol $TITLE denotes a title of the data, and the section symbol $END denotes an end of the data. Further, section symbols $CONTROL, $MODEL and $OUTPUT denote compartments of each statement block of three main statement blocks.

FIG. 7 shows one example of the data structure of the analysis control statement block shown in FIG. 6. In FIG. 7, the section symbol $FREQUENCY denotes the frequency, and the section symbol $CONVERGENCE denotes the decision value of the convergence. This statement block manages the various conditions for analysis, such as the frequency and the decision value of the convergence. The frequency is used for calculation of the intensity of an electromagnetic field. The section symbol $FREQUENCY designates some kinds of frequencies to calculate the intensity of an electromagnetic field. That is, the intensity of an electromagnetic field is calculated for each frequency, and calculations are repeated for all frequencies. The number of frequencies to be calculated are counted as shown by the step ST2 of FIG. 5. For example, when three kinds of frequencies, 100 MHz, 200 MHz, and 300 MHz, are designated by the section symbol $FREQUENCY, the total number of frequencies become "3" In the step ST2, a frequency counter (not shown) counts this number so that the calculations are repeated for three times. In this case, three kinds of frequencies, 100 MHz, 200 MHz, and 300 MHz, are determined based on higher harmonic frequencies consisting of integer times of the basic frequency at the wavesource.

FIG. 8 shows one example of the data structure of the output control statement block shown in FIG. 6. In FIG. 8, the section symbol $PATTERN denotes yes/no of the output of the electromagnetic radiation pattern, and the section symbol $COUNTOUR denotes yes/no of the output of the electromagnetic pattern having equivalent values. This statement block manages these yes/no outputs of these patterns.

The model description statement block shown in FIG. 11 manages the structural information of the electric circuit device to be analyzed. The structural information of the electric circuit is modeled by two portions. That is, the circuit device portions which can be modeled by the distributed constant circuit method are modeled by using the distributed constant circuit method, and the circuit device portions which cannot be modeled by the distributed constant circuit method are modeled by using the moment method.

Figure 9:
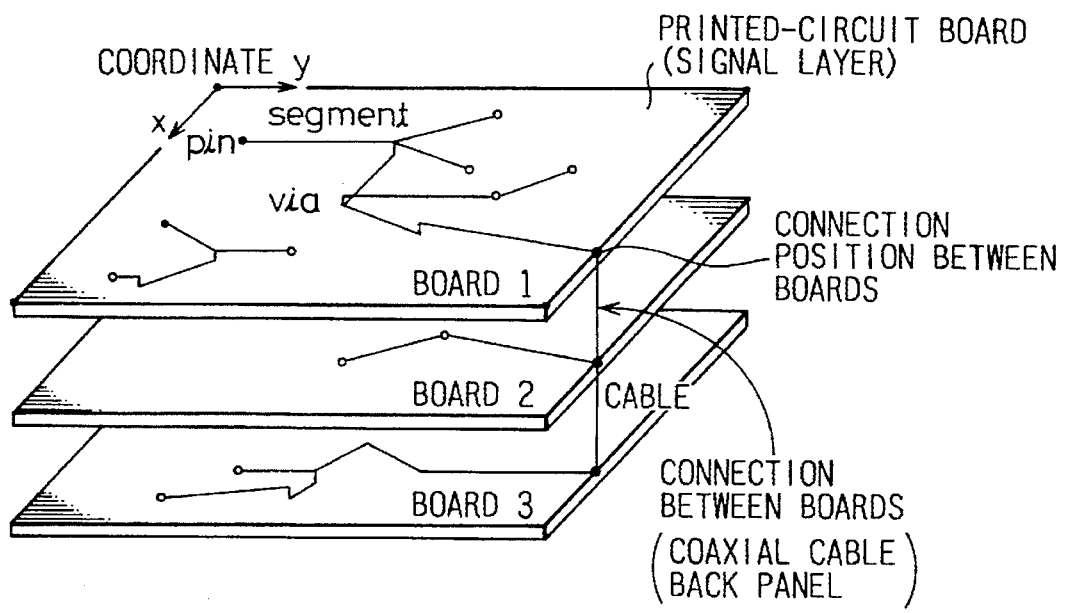
FIG. 9 shows one example of distributed constant circuit method modeled by a plurality of segments and pins on printed-circuit boards.

FIG. 9 shows one example of the distributed constant circuit method modeled by a plurality of segments and pins on printed-circuit boards. In FIG. 9, "pin", "segment" and "via" are shown on the printed-circuit boards 1 to 3. In this case, the "segment" denotes the pattern between pins on the signal wiring layer. The "via" denotes connection between the front surface pattern and the rear surface pattern. The printed-circuit boards are connected by coaxial cables C or a backpanel to each other through the connection point of the end of each board.

Figure 10:
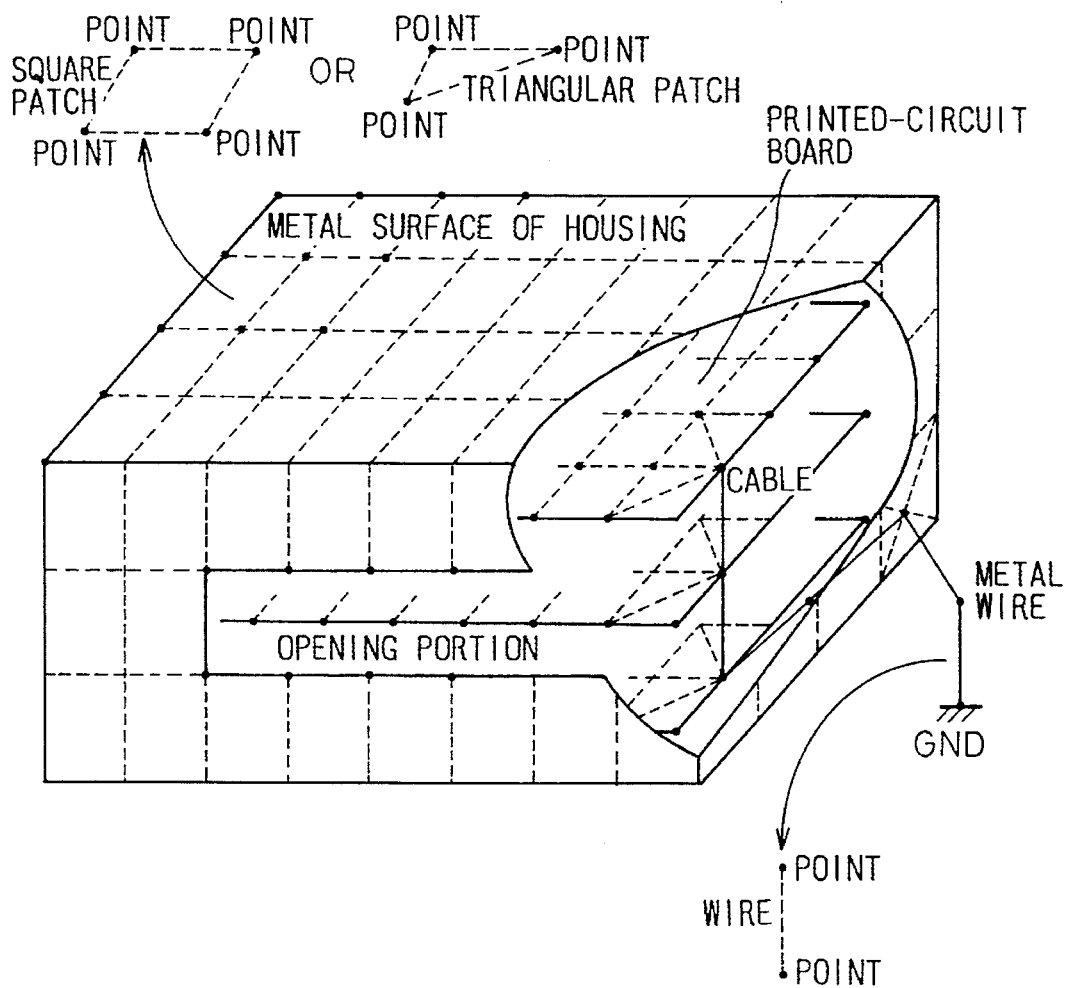
FIG. 10 shows one example of a moment method modeled by a plurality of patches obtained by dividing the metal surface of the housing of the electronic circuit device.
Figure 12A:
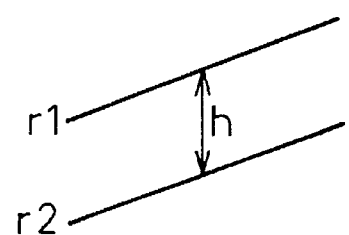
FIG. 12A to 12D show structural examples applicable for the distributed constant circuit method.
Figure 12B:
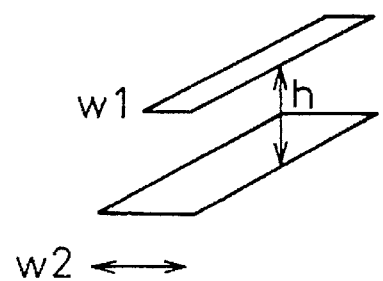
Figure 12C:
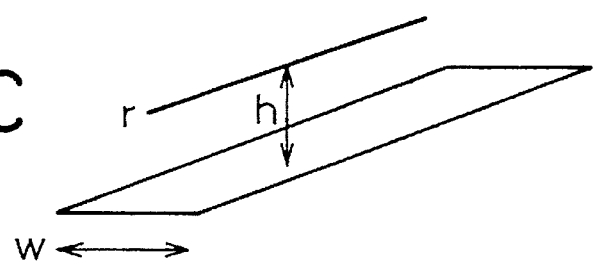
Figure 12D:
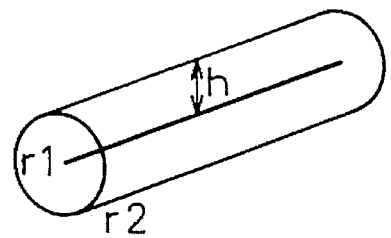

FIG. 10 shows one example of the moment method modeled by a plurality of patches obtained by dividing the electronic circuit device. In FIG. 10, either the square (or rectangular) patches each having four points or the triangular patches each having three points in corners are provided on the surface of the metal housing. A plurality of printed-circuit boards shown in FIG. 9 are provided within the metal housing. The connection between boards is realized by the coaxial cables, and the connection between the printed-circuit board and the metal housing is realized by the metal wires, and the metal wire is grounded (GND). The metal housing has at least one opening portion for cooling the electric circuit device.

FIG. 11 shows one example of the data structure of the model description statement block shown in FIG. 6. The model statement block manages point numbers, X-Y-Z coordinates, wiring number, material number, board number, wavesource number, load number, etc., using the following section symbols corresponding to each number. Each section symbol is defined as follows.

$POINT: point number, X-Y-Z coordinates;

$WIRE: wire number, material number, point numbers 1 and 2;

$PATCH: patch number, material number, point numbers 1 to 4;

$MATERIAL: material number, kind, dielectric ratio, conductivity, diameter of wire;

$BOARD: board number, material number, point numbers 1 to 4;

$SEGMENT: board number, segment number, X-Y coordinates, layer number;

$PIN: board number, pin number, X-Y coordinate, layer number, circuit number, wavesource number;

$SOURCE: wavesource number, point number of destination, voltage value;

$LOAD: load number, point number of destination, load impedance.

The operations of the present invention are explained below in detail with reference to FIGS. 4 to 11.

In step ST1, the input unit 10 receives the structural information of the electric circuit device to be analyzed from the input data file 20 in which the contents are shown in detail in FIG. 6. Further, the input unit 10 executes an initial-setting operation of the structural information of the electric circuit device.

In step ST2, the section unit 11 counts the frequencies in which the processes (i.e. calculation of the intensity of electromagnetic field) are completed (see, explanation of FIG. 7). That is, the section unit 11 determine whether or not processes, which are registered in the analysis control statement block, are completed for all frequencies. When the section unit 11 determines that processes are completed for all frequencies, all processes are completed. When the section unit 11 determines that processes are not completed for all frequencies, the section unit 11 selects one frequency from non-completed processes in order to continue the following processes.

In step ST3, further, the section unit 11 determines whether the electronic circuit device includes the applicable sections for the distributed constant circuit method or the applicable sections for the moment method. This determination is executed in such a way that the moment method is applied to the sections indicating $WIRE and $PATCH, and the distributed constant circuit method is applied to the sections indicating $SEGMENT and $PIN.

As another method, it is possible to directly determine whether the applicable sections for the distributed constant circuit method or the applicable sections for the moment method based on the shape and size of the structural information without use of the section symbols shown in FIG. 11. This method is explained with reference to FIGS. 12 to 15.

FIGS. 12A to 12D show structural examples which are applicable for the distributed constant circuit method. First, the printed-circuit board having signal wiring layers and ground wiring layers is determined as the applicable section for the distributed constant circuit method. Further, as shown in FIGS. 12A to 12D, the following structures, i.e., a parallel wiring structure having given constant diameters r1 and r2 and space "h" therebetween (see, FIG. 12A); a parallel plane board structure having given constant widths w1 and w2 and space "h" therebetween (see, FIG. 12B); a parallel wire and plane structure formed by the wire of the diameter "r"; the plane board of the width "w" and the space "h" therebetween (see, FIG. 12C); and a coaxial structure formed by the wire of the diameter r1 and the cylinder of the diameter r2 (see, FIG. 12D); are determined as the applicable sections for the distributed constant circuit method.

On the other hand, as shown in FIGS. 9 and 10, the following structures, i.e., the housing structure; wiring structure of the housing; the ground wiring structure from the housing to the ground; the shield structure mounted to the housing; and the conductive structure of the electronic circuits; are determined as the applicable sections for the moment method.

In step ST4, the first calculation unit 12 calculates the current distribution as explained below.

For "n" lines which are determined as the applicable sections for the distributed constant circuit, the input impedance of each line Zk (k=1 to n) is calculated in order from the downstream line using the load impedance (this is managed by the section symbol $LOAD) at the most downstream line.

Figure 13:
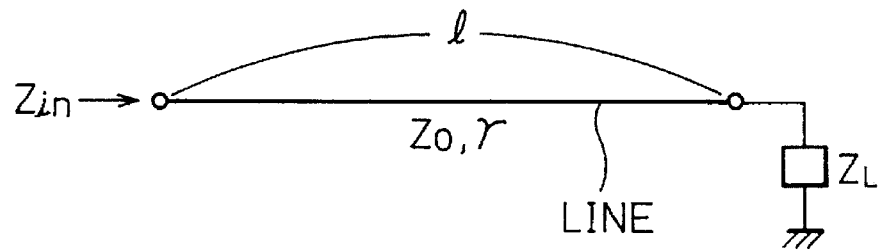
FIGS. 13 and 14 are explanatory views for explaining calculation of an input impedance.
Figure 14:
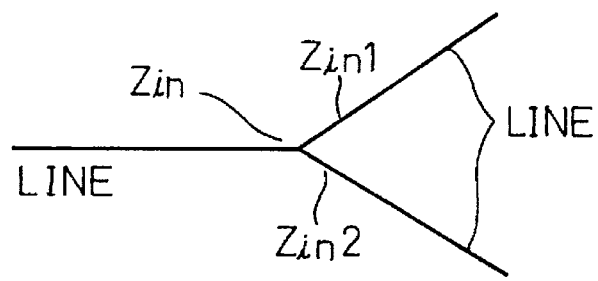
Figure 15:
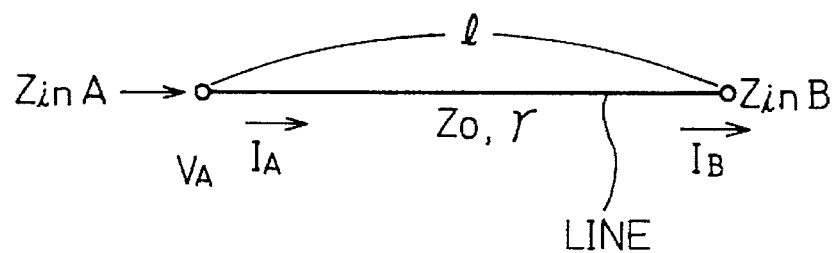
FIG. 15 is an explanatory view for explaining calculation of current.

FIGS. 13 and 14 are explanatory views for calculation of the input impedance, and FIG. 15 is an explanatory view for the calculation of the current.

As shown in FIG. 13, the input impedance Zk (=Zin) is calculated by the following formula based on the distributed constant circuit method.

$$Zin = Z_0 \frac{Z1 \cosh \gamma l + Z_0 \sinh \gamma l}{Z_0 \cosh \gamma l + ZL \sinh \gamma l} \quad (1)$$

Where, $Z_0$ is characteristics impedance of line;

$\gamma$ is the propagation constant;

l is length of line; and $Z_L$ is load impedance of downstream of line.

Further, the input impedance Zin which is positioned in the upstream of the line is calculated by using the new input impedance $Z_L$ which is newly calculated in the downstream line.

In this case, when the line is branched to directions as shown in FIG. 14, the input impedance Zin is calculated based on Ohm's law as follows.

$$Zin = \frac{Zin1 \cdot Zin2}{Zin1 + Zin2} \quad (2)$$

In step ST5, for "n" lines which are determined as the applicable sections for the distributed constant circuit method, the current Ik (k=1 to n) of each line is calculated in order from the upstream side of the line by using the wavesource at the most upper line (i.e., this wavesource is managed by the section symbol $SOURCE) and the calculated input impedance Zk.

As shown in FIG. 15, the current Ik is calculated based on the distributed constant circuit method as follows.

$$IB = \frac{VA \cosh \gamma l + Z_0 IA \sinh \gamma l}{ZinB} \quad (3)$$

Where, $Z_0$ is characteristic impedance of line;

$\gamma$ is propagation constant;

l is length of line;

Zin A is input impedance at upstream of line;

Zin B is input impedance at lowstream of line;

IA is current at upstream of line;

IB is current at lowstream of line; and

VA (=Zin A×IA) is wavesource at upstream of line.

In step ST6, the mutual impedance calculation unit 130 calculates the mutual impedance Zik (i=1 to m, j=i to m) between "m" sections each of which is determined as use of the moment method by using the known Green's function in order to calculate the current distribution for the sections applying the moment method. Further, the mutual impedance calculation unit 130 calculates the mutual impedance Zik (i=1 to m, k=1 to n) between "m" sections for the moment method and "n" sections for the distributed constant circuit as shown in FIGS. 16A and 16B.

In step ST7, based on the mutual impedance Zij and Zik calculated in step ST6, the voltage Vi (i=1 to m) which indicates the wavesource for the moment method designated by the section symbol $SOURCE, and the current Ik at the sections for the distributed constant circuit method calculated in step ST5, the current distribution calculation unit calculates the current Ii (i=1 to m) at the sections applying the moment method by using the integration equation of the moment method shown in FIG. 17.

In these calculation processes, the mutual impedance Zik is used only for the matrix calculation with the current Ik, and the current Ik is used only for calculation of the wavesource which is induced to the applicable sections applying the moment method.

Figure 18A:
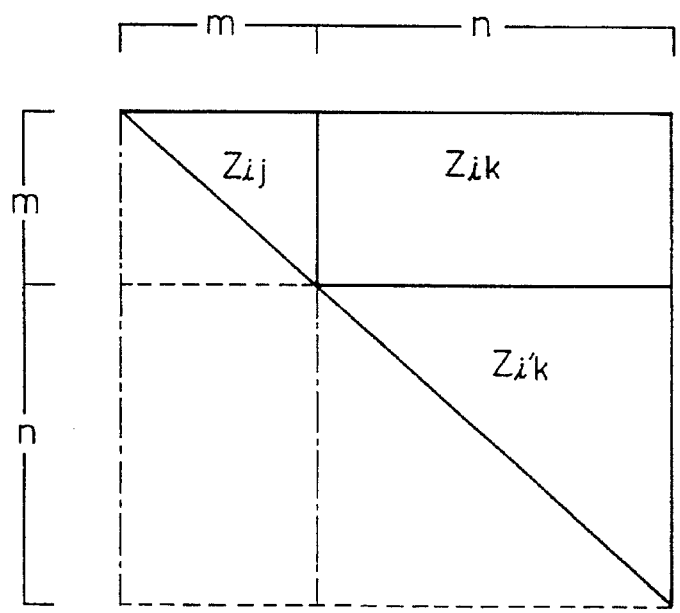
FIGS. 18A and 18B are explanatory views for explaining mutual impedance used in the integration equation.

That is, when the moment method is applied to the whole electronic circuit device to be analyzed, the integration equation of the moment method is solved by using the mutual impedance of "(n+m)×(n+m)" in a conventional art as shown in FIG. 18A.

Figure 18B:
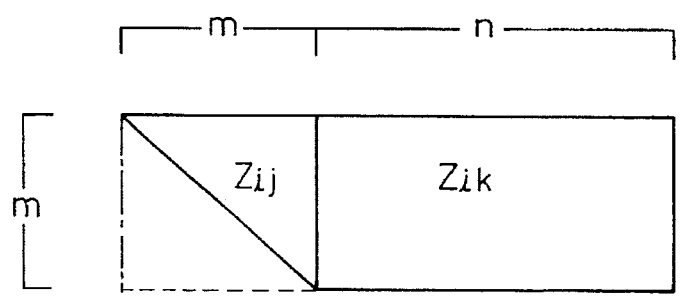

On the other hand, the integration equation of the moment method is solved by only using the mutual impedance of Zij of "m×m" in the present invention as shown in FIG. 18B. Accordingly, in the present invention, it is possible to solve the integration equation at high speed. In this case, as is obvious from FIGS. 18A and 18B, since the mutual impedance is expressed by a symmetrical matrix (see, solid lines and dotted lines), only one half the amount of calculation is required in actual calculation process.

As explained above, the current Ik at the applicable sections for the distributed constant circuit is calculated in step ST5, and the current Ii at the sections for the moment method is calculated in the current distribution calculation unit 132 as shown in step ST7.

In step ST8, the third calculation unit 14 counts observation points in which processes are completed, and determines whether all processes for all observation points, which are registered in the output control statement block, are completed. When the third calculation unit 14 determines that the processes are completed, the process returns to the step ST2. When the third calculation unit 14 determines that the processes are not completed, the third calculation unit 14 selects one observation point from the processes which are not completed.

In step ST9, the third calculation unit 14 further calculates the intensity of the electromagnetic field caused by the current Ik and Ii at the observation point by using the current Ik in the step ST5 and the current Ii in the step ST7, and outputs the result of the calculation to the output unit 15. The output data file 21 stores the result of the calculation of the intensity of electromagnetic field.

Figure 19:
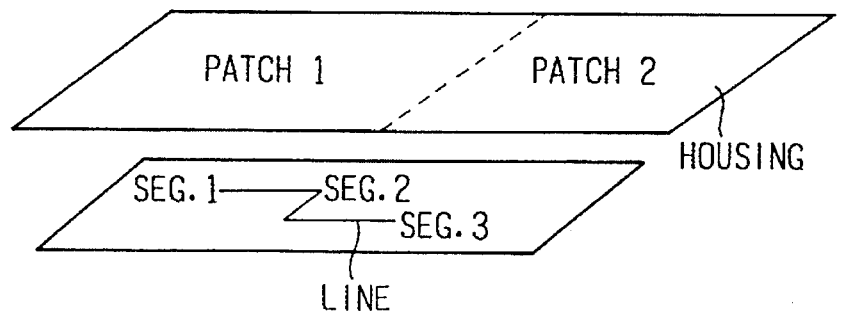
FIG. 19 shows one structural example of the electronic circuit device.

FIG. 19 shows one example of an electromagnetic circuit device. This drawing corresponds to FIGS. 9 and 10. This drawing is simplified in order to explain the present invention. As is obvious from the above explanations, the electronic circuit device to be analyzed is divided into two sections, i.e., the applicable section for the moment method and the applicable section for the distributed constant circuit method. In this case, two patches (patch 1, patch 2) are applicable for the moment method, and three segments (seg. 1 to seg. 3) are applicable for the distributed constant circuit method. This device can be analyzed as follows.

Figure 20:
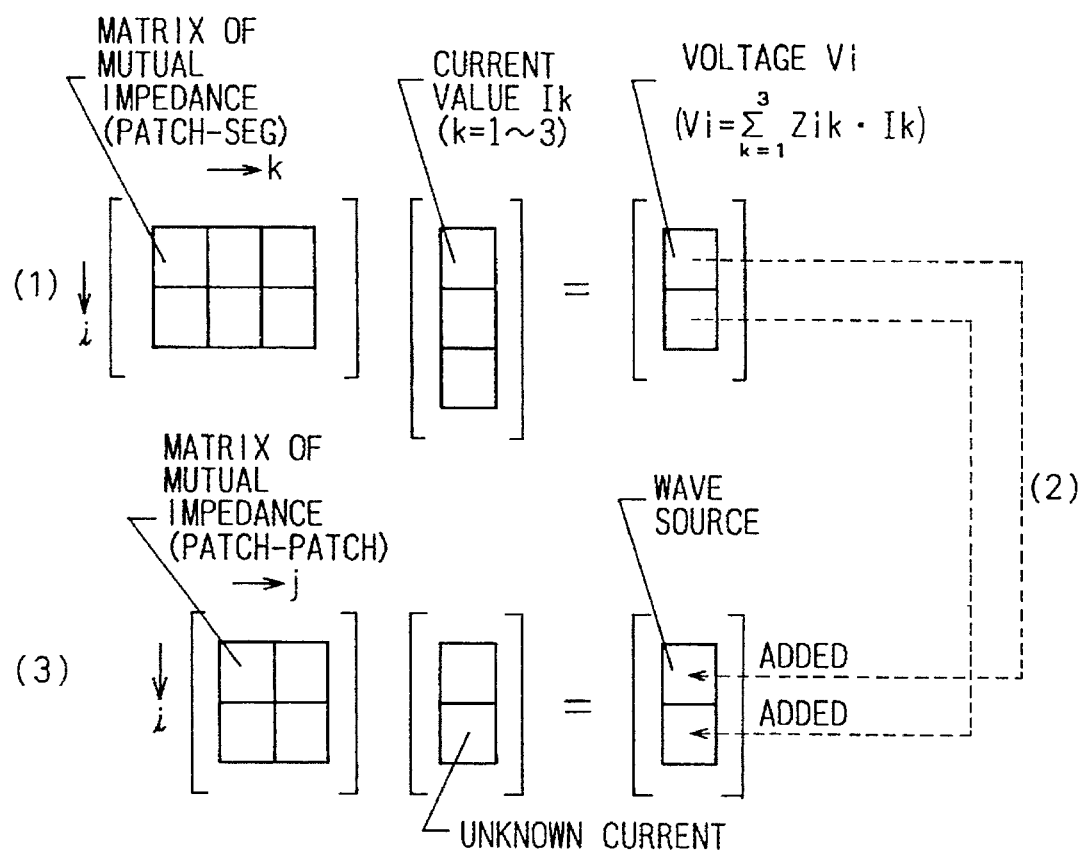
FIG. 20 is an explanatory view for explaining the calculation process of the present invention.

FIG. 20 is an explanatory view for the structure shown in FIG. 19. The current flowing in the patch is obtained based on the integration equation as follows. That is, in step (1), the voltage value (wavesource, Vi=Σ Zik Ik (k=1 to 3) of each patch is calculated based on the mutual impedance matrix between the patch and segment, and the current Ik (k=1 to 3). Further, the voltage value Vi in step (1) is added to the wavesource (step (2)). Accordingly, in step (3), the unknown current flowing through the patch is calculated based on the mutual impedance between patches, and the wavesource.

FIG. 21 is a schematic block diagram of a system applying the present invention. The structural information, such as shape, size, material characteristic, electrical characteristics, etc., of the object (electronic circuit device to be analyzed) are input to the CAD system. Further, these structural information are stored in the input data file 20. The calculation apparatus for intensity of electromagnetic field is provided in a computer so that all calculations in the first/second/third calculation units 12 to 14 shown in FIG. 4 are executed based on software. The results of calculation, i.e., intensity of electromagnetic field, are stored in the output data file 21. Further, the data stored in the file 21 are effectively utilized in a CAE (Computer Aided Engineering) system by graphically displaying the distribution of the intensity of the electromagnetic field obtained by the present invention.

We claim:

1. A computer implemented calculation apparatus for calculating an intensity of electromagnetic field radiated from an electronic circuit device, comprising:

an input data file for storing structural information of the electronic circuit device;

input means for receiving the structural information from the input data file;

section means for dividing the electronic circuit device into a first section that is applicable for a distributed constant circuit method to calculate the intensity of electromagnetic field and a second section that is inapplicable for the distributed constant circuit method to calculate the intensity of electromagnetic field, as determined by the structural information of the electronic circuit device;

first calculation means for calculating a first current distribution at the first section that is applicable for the distributed constant circuit method;

second calculation means for calculating a second current distribution at the second section using a moment method and using the first current distribution;

third calculation means for calculating the intensity of electromagnetic field radiated from the electronic circuit device based on the first and second current distributions; and output means for outputting the calculated intensity of electromagnetic field to an output data file.

2. A computer implemented calculation apparatus for calculating an intensity of electromagnetic field as claimed in claim 1, wherein said second calculation means comprise:

mutual impedance calculation means for calculating first and second mutual impedances, the first mutual impedance being a mutual impedance of the second section, and the second mutual impedance being a mutual impedance between the first section and the second section;

induced wavesource calculation means for calculating a wavesource induced by the second current distribution to the second section in accordance with a matrix calculation between the first current distribution obtained by the first calculation means and the second mutual impedance obtained by the mutual impedance calculation means; and current distribution calculation means for calculating the current distribution at the second section based on the moment method by using the first mutual impedance in accordance with the wavesource.

3. A computer implemented calculation apparatus for calculating an intensity of electromagnetic field as claimed in claim 2, wherein said current distribution calculation means utilize composite values of two wavesources for the moment method, the first wavesource being the wavesource calculated by the induced wavesource calculation means, and the second wavesource being a wavesource included in the second section.

4. A computer implemented calculation apparatus for calculating an intensity of electromagnetic field as claimed in claim 1, wherein the input data file stores the structural information in the form of three statement blocks using various section symbols, comprising an analysis control statement block, a model description statement block, and an output control statement block.

5. A computer implemented calculation apparatus for calculating an intensity of electromagnetic field as claimed in claim 4, wherein said analysis control statement block includes at least the section symbols representing frequencies and convergence decision values.

6. A computer implemented calculation apparatus for calculating an intensity of electromagnetic field as claimed in claim 4, wherein said output control statement block includes at least the section symbols representing electric field radiation patterns and electric field equivalent value patterns.

7. A computer implemented calculation apparatus for calculating an intensity of electromagnetic field as claimed in claim 4, wherein said model description statement block includes at least the section symbols representing point number, wiring number, patch number, material number, printed-circuit member, wavesource number, load number, segment number, and X-Y-Z coordinate.

8. A computer implemented calculation apparatus for calculating an intensity of electromagnetic field as claimed in claim 4, wherein said section means divides the electronic circuit device into the first section and the second section based on the various section symbols.

9. A computer implemented calculation apparatus for calculating an intensity of electromagnetic field as claimed in claim 1, wherein said section means determines the first section to be parts of device which can be approximated as a one dimensional structure.

10. A computer implemented calculation apparatus for calculating an intensity of electromagnetic field as claimed in claim 9, wherein said one dimensional structure is constructed by printed-circuit board having signal wiring layers and ground wiring layers.

11. A computer implemented calculation apparatus for calculating an intensity of electromagnetic field as claimed in claim 1, wherein said section means determines the first section to be cable portions having a coaxial structure.

12. A computer implemented calculation apparatus for calculating an intensity of electromagnetic field as claimed in claim 1, wherein said section means determines the first section to be parallel wiring portions.

13. A computer implemented calculation apparatus for calculating an intensity of electromagnetic field as claimed in claim 1, wherein said section means determines the first section to be parallel plane board portions.

14. A computer implemented calculation apparatus for calculating an intensity of electromagnetic field as claimed in claim 1, wherein said section means determines the first section to be structural portions formed in parallel by a plane board and wiring.

15. A computer implemented calculation apparatus for calculating an intensity of electromagnetic field as claimed in claim 1, wherein the first section for the distributed constant circuit method are equivalent to the second section for the moment method.

16. A computer implemented calculation apparatus for calculating an intensity of electromagnetic field as claimed in claim 10, wherein the signal wiring layer on the printed-circuit board is modeled by X-Y coordinates for pins, segments and vias on each board in the distributed constant circuit method.

17. A computer implemented calculation apparatus for calculating an intensity of electromagnetic field as claimed in claim 1, wherein a metal surface of a housing of the electronic circuit device to be analyzed is divided into a plurality of square patches or triangular patches each having node points in corners thereof.

18. A computer implemented calculation apparatus, comprising:
   a first calculator calculating a first current of an electronic device by a distributed constant circuit method based on first structural information of the electronic device;
   a second calculator calculating a second current of the electronic device by a moment method based on both second structural information of the electronic device and the first current;
   a receiver receiving structural information of the electronic device;
   a separator separating the structural information into first and second structural information;
   a third calculator calculating an electromagnetic field intensity based on the first and second currents; and
   an output device outputting the calculated electromagnetic field intensity to an output file.

19. A computer implemented calculation method, comprising:
   calculating a first current of an electronic device by a distributed constant circuit method based on first structural information of the electronic device;
   calculating a second current of the electronic device by a moment method based on both second structural information of the electronic device and the first current;
   collecting structural information of an electronic device;
   separating the structural information into first and second structural information;
   calculating an electromagnetic field intensity based on the first and second currents; and
   outputting the calculated electromagnetic field intensity to an output file.

* * * * *

UNITED STATES PATENT AND TRADEMARK OFFICE
CERTIFICATE OF CORRECTION

PATENT NO. : 5,650,935
DATED : July 22, 1997
INVENTOR(S) : NISHINO et al.

It is certified that error appears in the above-identified patent and that said Letters Patent is hereby corrected as shown below:

Col. 2, line 43, begin a new paragraph with "In".

Col. 4, line 44, change "add" to --current--.

Col. 7, line 65, after " "3" " insert --.--.

Col. 10, in Equation (1), change "$\gamma 1$" to --$\gamma \ell$-- (four occurrences);
line 11, change "1" to --$\ell$--;
in Equation (3), change "$\gamma 1$" to --$\gamma \ell$-- (both occurrences);
line 39, change "1" to --$\ell$--;
line 47, change "Zik" to --Zij--.

Col. 11, line 22, change "STS" to --ST8--.

Signed and Sealed this

Seventeenth Day of February, 1998

*Attest:*

BRUCE LEHMAN

*Attesting Officer*  *Commissioner of Patents and Trademarks*